Patented May 21, 1935

2,001,975

UNITED STATES PATENT OFFICE 2,001,975

DYESTUFFS OF THE NAPHTHOPHENAZINE SERIES

Theodor Nocken, deceased, late of Leverkusen-I. G.-Werk, Germany, by Elisabeth Nocken, Frankfort-on-the-Main, Germany, administratrix, and Wilhelm Neelmeier, Leverkusen-I. G.-Werk, Germany, assignors to General Aniline Works, Inc., New York, N. Y., a corporation of Delaware No Drawing. Application January 23, 1933, Serial No. 653,176. In Germany February 3, 1932

5 Claims. (Cl. 260—29)

The present invention relates to new dyestuffs of the naphthophenazine series and to a process of preparing same, more particularly it relates to dyestuffs which may be represented by the probable general formula

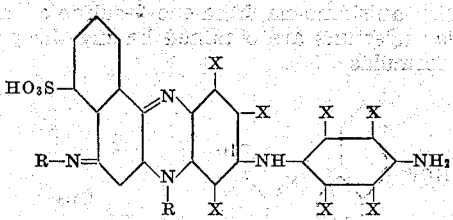

wherein one X stands for a sulfonic acid group and the other X's represent hydrogen atoms which partially may be replaced by alkyl groups and wherein the R's stand for radicals of the benzene series.

The new dyestuffs are obtainable according to the known methods of preparing dyestuffs of the azine series by reacting in the usual manner with an oxidizing agent upon a mixture of a 1.3-diarylaminonaphthalene-8-sulfonic acid and a monosulfonic acid of the 4.4'-diamino-diphenylamine or its alkyl substitution products in a suitable solvent or diluent.

For example, the oxidation can be performed in an alkaline solution with sodium hypochlorite or in the presence of acetic acid with sodium bichromate; the preferred method of preparing my dyestuffs consists in passing a current of oxygen or a gas containing oxygen, for example air, through a weakly alkaline solution of the components in the presence or absence of a catalyst, as for example, an ammoniacal solution of copper tetrammine. In many cases the formation of the dyestuff already takes place at room temperature rather rapidly and can be accelerated by heating to 50-60° C. and/or by finely dispersing the current of air blown through the reaction mixture.

Our new dyestuffs are in form of their alkali metal salts generally dark powders with a bronze lustre, soluble in water with a blue coloration, soluble in sulfuric acid with a green tint and dyeing wool from an acid bath generally intense greenish-blue shades.

Our new dyestuffs advantageously distinguish from the known dyestuffs obtainable by condensing 4-nitroso-4'-acetamino-diphenylamino sulfonic acid with 1,3-diarylaminonaphthalene-6- or 7-sulfonic acid and saponifying the acetamino group, and from the azines described in United States Patent 940,354, by dyeing the the fibre more greenish shades; further they generally yield dyeings of a more satisfactory fastness to light, and, first of all, they exert an excellent capacity for even dyeing.

Compared with the safranines from 1,3-diarylaminonaphthalene-3,6-disulfonic acid and 4,4'-diamino-diphenylamino sulfonic acid, our new dyestuffs have the advantage of dyeing wool more uniform shades. When applied to silk, the dyestuffs show a very good fastness to washing and water.

The following examples serve to illustrate the invention, without limiting it thereto, the parts being by weight:

Example 1.—450 parts of 1.3-di-p-anisidinonaphthalene-8-sulfonic acid and 279 parts of 4,4'-diaminodiphenylamino-3-sulfonic acid are mixed with 7000 parts of a 50% aqueous alcohol; then the mixture is neutralized with soda or ammonia and thereto are added 50 parts of an aqueous ammoniacal solution of ammoniacal copperoxide (prepared from about 20 parts of copper sulfate). The mixture is heated to about 50° C. and at this temperature a current of air is blown through until the formation of the dyestuff is complete. The dyestuff is salted out with common salt, filtered off and dried. It is obtained as a dark crystalline powder having a bronze lustre; it is soluble in water with a blue and in concentrated sulfuric acid with a green coloration and dyes wool from an acid bath clear greenish-blue shades which do not change in artificial light and which have a good fastness to light and fulling. Also the dyeings on silk have a good fastness to washing.

The dyestuff can in the free state be represented by the probable formula

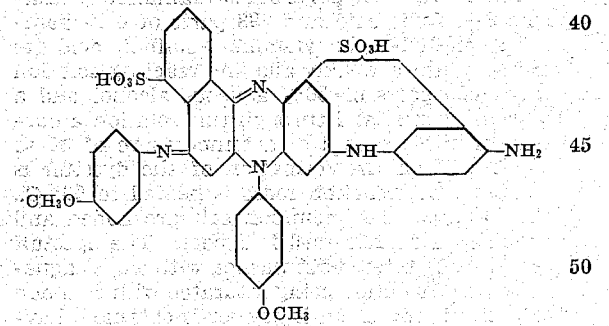

(The exact position of the above sulfonic acid group is not known)

When replacing the 1,3-di-p-anisidinonaphthalene-8-sulfonic acid by 390 parts of 1,3-dianilinonaphthalene-8-sulfonic acid or by 418 parts of 1,3-di-p-toluidino-naphtalene-8-sulfonic acid, dyestuffs exerting similar properties are obtained, these dyestuffs having probably the following formulæ:

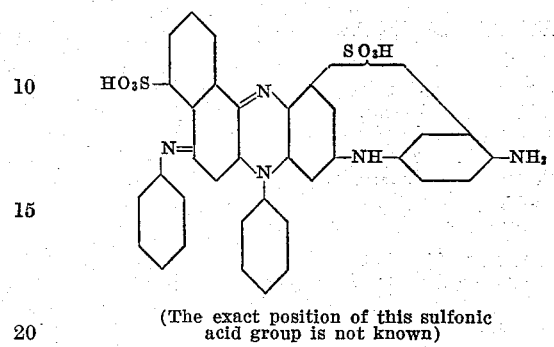

(The exact position of this sulfonic acid group is not known)

or

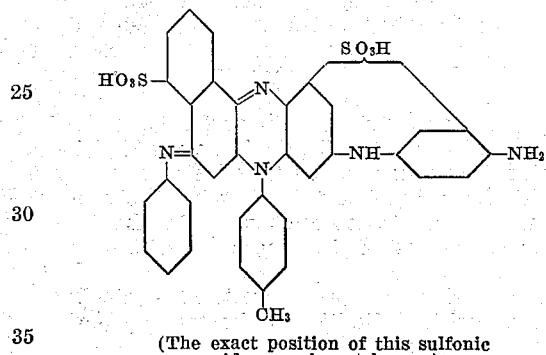

(The exact position of this sulfonic acid group is not known)

respectively.

When replacing the 4,4'-diaminodiphenylamino-3-sulfonic acid by the 4,4'-diaminodiphenylamino-2-sulfonic acid a dyestuff is obtained which can be represented by the probable general formula

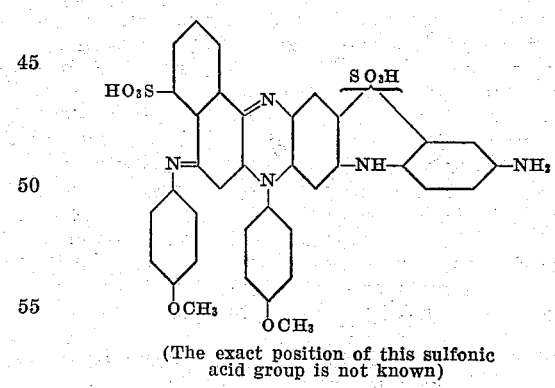

(The exact position of this sulfonic acid group is not known)

Example 2.—390 parts of 1,3-dianilinonaphthalene-8-sulfonic acid and 293 parts of 4,4'-diamino-3'-methyl-diphenylamine-2-sulfonic acid are brought into a weakly alkaline reacting solution with 7000 parts of 50% aqueous alcohol and a little ammonia, and through this solution a current of air is passed at a temperature of 35 to 40° C. When the formation of the dyestuff is complete the reaction mass is heated to 60° C., then 350 parts of common salt are added and the mass is stirred until it is cool. The dyestuff separated is filtered off, washed with a 50% aqueous alcohol solution being saturated with common salt and dried. A dark powder is obtained, having a bronze lustre, being soluble in water with a blue, in concentrated sulfuric acid with a greenish blue coloration, dyeing wool and silk in greenish-blue shades. The dyeings on wool show a very good fastness to washing, fulling, sea water, alkali and light; the dyeings on silk are fast to washing and water. All dyeings do not change their shade in artificial light.

The dyestuff may be represented by the following probable formula

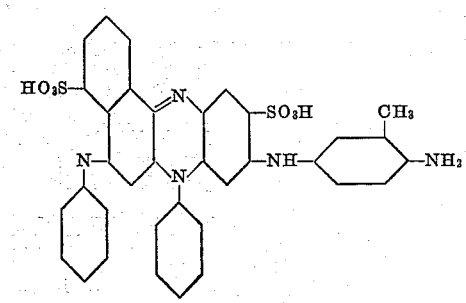

When replacing the 4,4'-diamino-3'-methyldiphenylamin-2-sulfonic acid by the 4,4'-diamino-3'-5-dimethyldiphenylamin-2-sulfonic acid, or when using instead of the 1,3-dianilinonaphthalene-8-sulfonic acid the 1,3-di-p-toluidino- or the 1,3-di-p-anisidino-naphthalene-8-sulfonic acid, similar dyestuffs are obtained having the probable formulas

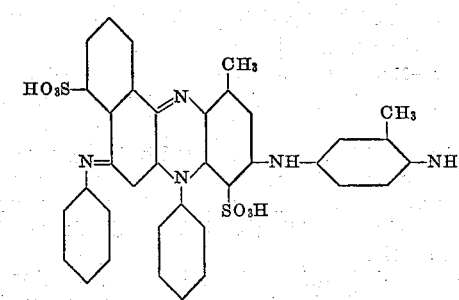

or

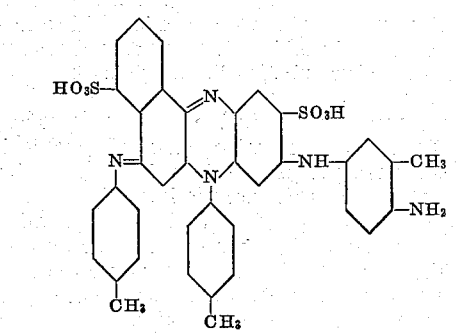

or

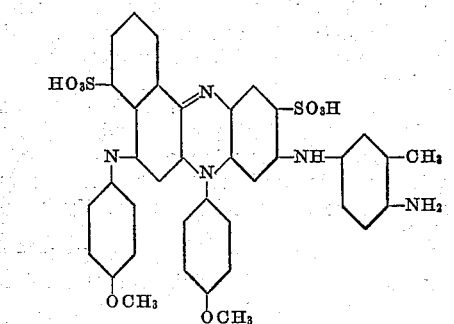

respectively showing when dyed on wool good fastness properties to fulling and washing.

What is claimed is:

1. The naphthophenazine dyestuffs of the general formula

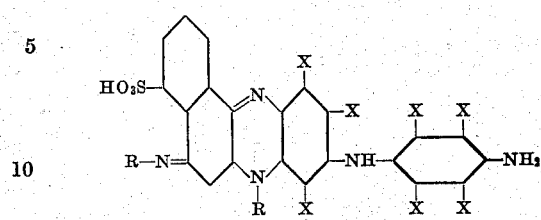

wherein one X stands for a sulfonic acid group and the other X's represent hydrogen atoms which may partially be replaced by alkyl groups, R standing for a radical of the benzene series, being in form of their alkali metal salts generally dark powders with a bronze lustre, soluble in water with a blue coloration, soluble in sulfuric acid with a green tint, dyeing wool from an acid bath generally intense greenish-blue shades.

2. The naphthophenazine dyestuffs of the general formula

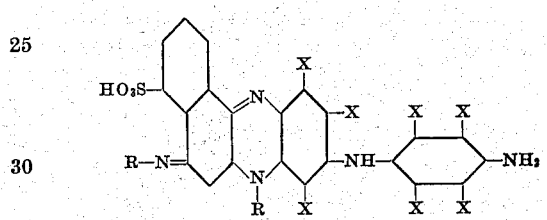

wherein one X stands for a sulfonic acid group and the other X's represent hydrogen atoms which may partially be replaced by methyl groups, R standing for a radical of the benzene series, being in form of their alkali metal salts generally dark powders with a bronze lustre, soluble in water with a blue coloration, soluble in sulfuric acid with a green tint, dyeing wool from an acid bath generally intense greenish-blue shades.

3. The naphthophenazine dyestuffs of the general formula

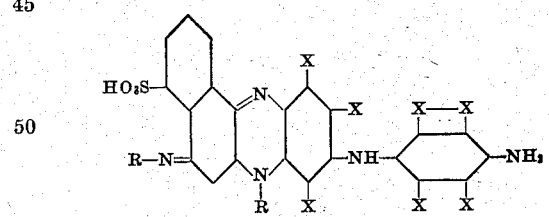

wherein one X stands for a sulfonic acid group and the other X's represent hydrogen atoms which may partially be replaced by alkyl groups, R standing for a benzene nucleus which may be substituted by substituents selected from the group consisting of alkyl and alkoxy, being in form of their alkali metal salts generally dark powders with a bronze lustre, soluble in water with a blue coloration, soluble in sulfuric acid with a green tint, dyeing wool from an acid bath generally intense greenish-blue shades.

4. The naphthophenazine dyestuffs of the general formula

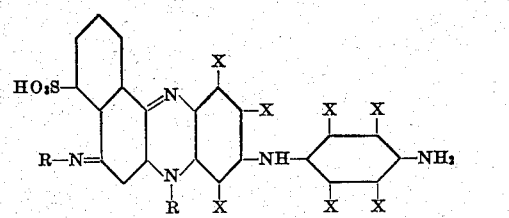

wherein one X stands for a sulfonic acid group and the other X's represent hydrogen atoms which may partially be replaced by methyl groups, R standing for a benzene nucleus which may be substituted by substituents selected from the group consisting of alkyl and alkoxy, being in form of their alkali metal salts generally dark powders with a bronze lustre, soluble in water with a blue coloration, soluble in sulfuric acid with a green tint, dyeing wool from an acid bath generally intense greenish-blue shades.

5. The dyestuff having in its free state the following formula

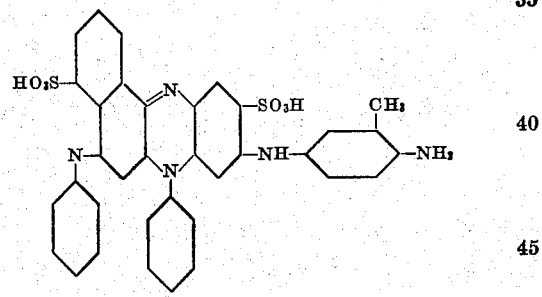

being in form of its alkali metal salts generally dark powders with a bronze lustre, soluble in water with a blue coloration, soluble in sulfuric acid with a green tint, dyeing wool from an acid bath intense greenish-blue shades.

ELISABETH NOCKEN,
*Administratrix of Theodor Nocken, Deceased.*
WILHELM NEELMEIER.